United States Patent Office 3,737,543
Patented June 5, 1973

3,737,543
ECTOPARASITICIDALLY ACTIVE 2-ARYLAMINO-1-ALKYL LACTAMS
Edgar Enders, Cologne, and Wilhelm Stendel, Wuppertal-Elberfeld, Germany, assignors to Farbenfabriken Bayer Aktiengesellschaft, Leverkusen, Germany
No Drawing. Filed Oct. 19, 1970, Ser. No. 81,983
Claims priority, application Germany, Nov. 3, 1969, P 19 55,072.2
Int. Cl. A01n 9/00
U.S. Cl. 424—267     8 Claims

ABSTRACT OF THE DISCLOSURE

Compositions and methods of using certain 2-arylimino-1-alkyl lactams of the formula

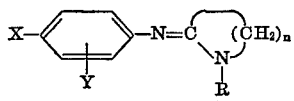

(I)

in which one of X and Y is halogen and the other is halogen or lower alkyl,
R is alkyl or alkenyl with up to 6 carbon atoms, and
$n$ is 4 or 5, which possess strong parasiticidal properties, especially animal acarid ectoparasiticidal properties.

The present invention relates to and has for its objects the provision of particular new active compositions in the form of mixtures with solid and liquid dispersible carrier vehicles of certain 2-arylimino-1-alkyl lactams which possess valuable strong parasiticidal, especially animal acaricidal, properties, and methods for using such compounds in a new way, especially for combating and controlling ectoparasites, e.g. acarids, with other and further objects becoming apparent from a study of the within specification and accompanying examples.

It is known from French patent specification 1,504,840 that arylamidines, such as N-(3,4-dichlorophenyl)-N'-dimethylacetamidine, are suitable for the control of acarids.

It has now been found that the 2-arylimino-1-alkyl lactams of the formula:

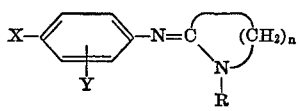

(I)

in which one of X and Y is halogen and the other is halogen or lower alkyl,
R is alkyl or alkenyl with up to 6 carbon atoms, and
$n$ is 4 or 5, exhibit strong acaricidal properties and can be used for the control of animal ectoparasites from the class of the acarids.

The invention therefore provides a composition for the control of animal ectoparasites containing as active ingredient a compound of Formula I in admixture with a solid diluent or carrier or in admixture with a liquid diluent or carrier containing a surface-active agent.

The invention also provides a method of combating animal ectoparasites which comprises applying to the animal a compound of Formula I alone or in the form of a composition containing as active ingredient a compound of Formula I in admixture with a solid or liquid diluent or carrier.

The compounds of Formula I can be prepared by a process in which aniline derivatives of the formula:

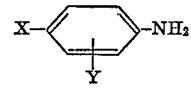

(II)

in which X and Y have the meanings stated above, and are condensed with N-alkyl lactams or N-alkenyl lactams of the formula:

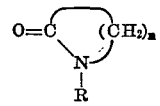

(III)

in which R and $n$ have the meanings stated above, in the presence of agents which split off water.

Surprisingly, the 2-arylimino-1-alkyl lactams to be used according to the invention possess a better acaricidal activity than the arylamidines known from the prior art. The substances according to the invention therefore represent an enrichment of the art.

If 3-methyl-4-chloroaniline and N-allylcaprolactam are used as starting materials in the process described above, the reaction course can be represented by the following formula scheme:

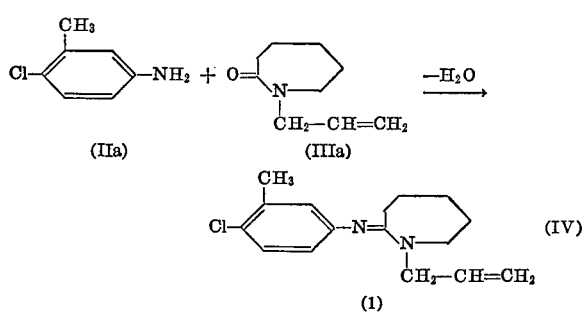

The starting materials used as anilines are already known and are defined by the Formula II stated above. In this formula and in Formula I, X and Y stand preferably for chlorine, bromine or fluorine as well as for alkyl of 1 to 4 carbon atoms, especially methyl or ethyl. Suitable aniline derivatives are for example 3,4-dichloro-aniline, 2, 4-dichloro-aniline, 3-bromo-4-chloro-aniline, 2,4-dibromo-aniline, 4-bromo-3-chloro-aniline, 2-bromo-4-chloro-aniline, 4-bromo-2-chloro aniline, 4-fluoro-3-bromo-aniline, 4-fluoro-2-chloro-aniline, 4-chloro-2-methyl-aniline, 4-bromo-2-methyl-aniline, 4-chloro-2-ethyl-aniline, 4-bromo-2-ethyl-aniline, 4-chloro-3-methyl aniline, 4-bromo-3-methyl-aniline, 4-methyl-3-chloro-aniline, 4-methyl-3-bromoaniline, and the like.

The N-alkyl lactams or N-alkenyl lactams used as starting materials are known and are characterized by the formula stated above. In this formula and in Formula I, R stands preferably for lower alkyl or alkenyl especially with up to 4 carbon atoms.

The reaction can be carried out in the presence of an inert solvent which term includes a mere diluent. Suitable solvents include aromatic hydrocarbons, such as benzene, toluene and xylene; and chlorinated hydrocarbons, such as chlorobenzene, dichlorobenzenes and tetrachloroethylene.

Preferred agents which split off water include inorganic acid halides, such as phosphorus oxychloride, thiophosphoryl chloride, phosphorus trichloride, thionyl chloride, phosgene, silicon tetrachloride and tin tetrachloride.

The reaction temperatures can be varied within a fairly wide range. In general, the reaction is carried out at from 20 to 120° C., preferably 40 to 100° C.

The active compounds to be used according to the invention can also be prepared by reaction of one of the aforesaid aniline derivatives with a lactam derivative of the general formula:

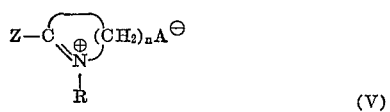

(V)

in which

R and $n$ have the meanings stated above,
Z is an alkoxy or alkylthio radical, and
$A^\ominus$ is the anion of an acid.

The active substances to be used according to the invention possess basic character. They can be used as free bases or in the form of their salts, for example hydrochlorides, sulphates, phosphates, nitrates or acetates. References herein to the lactams therefore are to be understood as including the salts thereof.

The free bases, like the salts, exhibit strong acaricidal activity, particularly against acarids which as animal ectoparasites infect domesticated animals, such as cattle, sheep and rabbits. At the same time, the active compounds which can be used according to the invention have only a slight toxicity to warm-blooded animals. They are therefore well suited for the control of animal ectoparasites from the Order of the acarids.

As economically important ectoparasites of this Order from the Family of the Ixodidae, which play a large part in tropical, subtropical and temperate latitutdes, there are mentioned for example:

The Australian and South American one-host cattle tick *Boophilus microplus,* the Central and North American one-host cattle tick *Boophilus annulatus,* the African one-host cattle tick *Boophilus decoloratus.*

In the course of time, ticks in particular have become resistant to the phosphoric acid esters and carbamates used hitherto as control agents, so that the success of control in many areas is to a growing extent rendered doubtful. To safeguard an economic livestock hubandry in the infestation areas, there is an urgent need for agents with which all developemnt stages, that is to say larvae, nymphs, metanymphs and Adulti, of resistant strains, for example of the genus Boophilus, can be controlled with certainty. Examples of strains which are largely resistant to the phosphoric acid ester agents existing hitherto are, for example, in Australia the Ridgeland strain and the Biarra strain of *Boophilus microplus.*

The active compounds according to the invention are equally effective against the normally sensitive and against the resistant strains, for example of Boophilus. In customary application to the host animal, they not only act directly lethally on all forms parasitizing on the animal but also act strongly ovicidally on the adult form, so that the propagation cycle of the ticks is interrupted in the parasitic phase on the animal as well as in the non-parasitic phase.

The depositing of eggs is largely prevented, the development and the hatching inhibited.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, such as o-dichlorobenzene, trichlorobenzene, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), pyrrolidones (e.g. N-methyl-pyrrolidone-2), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic and/or cationic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, quaternary ammonium salts of longer, e.g. $C_{6-20}$, alkyl radicals, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially hygiene control or disinfectant agents, such as other parasiticides, or acaricides, insecticides, fungicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or animal, e.g. livestock, application generally contemplate those in which the active compound is present in an amount substantially between about 0.001–5%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.01–95%, by weight of the mixture.

It will be appreciated that the application concentrations are produced in connection with the above noted formulations normally by dilution with water. Furthermore, such concentrations can, according to the application form, be varied within a fairly wide range and are generally substantially between about 10 to 50,000 p.p.m. (g./g.), preferably between about 100 to 10,000 p.p.m., i.e. 0.001–5%, preferably 0.01–1%, as aforesaid.

Advantageously, the aqueous solutions or emulsions of the instant active compounds possess a markedly good stability under practical conditions, so that, even after standing for long periods at a pH in the range of from 7–9, such compounds may remain effective, i.e. even for three months or longer.

In particular, the present invention contemplates methods of selectively killing, combating or controlling pests, e.g. parasites, i.e. animal acarid ectoparasites, which comprises applying to at least one of correspondingly (a) such animal acarid ectoparasites, and (b) the corresponding habitat, i.e. the locus to be protected, e.g. the animal or livestock, a correspondingly combative or toxic amount, i.e. animal acarid ectoparasiticidally effective amount of the particular active compound of the invention alone or together with a carrier vehicle as noted above. The instant formulations or compositions are applied in the usual manner, for instance by spraying, atomizing, scattering, dusting, watering, i.e. as a bath (dip), sprinkling, pouring, and the like.

It will be realized, of course, that the concentration of the particular active compound utilized in admixture with the carrier vehicle will depend upon the intended application. Therefore, in special cases it is possible to go above or below the aforementioned concentration ranges.

The active compounds also have an activity against plant-damaging mites.

The unexpected superiority and outstanding activity of the particular new compounds of the present invention is illustrated, without limitation, by the following example:

EXAMPLE 1

In vitro test for ovicidal effect on ticks

The determination of the ovicidal effect on ticks (inhibition of egg depositing) takes place in vitro in the experimental procedure described in the following:

3 g. of active compound are mixed with 7 g. of a mixture of equal parts by weight of ethyleneglycol monomethyl ether and nonylphenol polyglycol ether. The emulsion concentrate so obtained is diluted with water to the application concentration desired in each case.

Adult, gorged female ticks of the species *Boophilus microplus* (resistant) are immersed for one minute in this preparation of active compound. After immersion of, in each case, 10 female specimens of the various strains of ticks, the individual ticks are transferred into plastic dishes, the bottom of each of which is covered with a filter paper disc.

After 35 days, the effectiveness of the preparation of active compound is determined by ascertaining the inhibition of the depositing of fertile eggs compared with the egg deposition of untreated control ticks. The effect is stated in percent, 100% meaning that fertile eggs ceased to be deposited, and 0% meaning that the ticks have deposited eggs in normal manner like the untreated control ticks.

The results obtained are given in the following Table 1.

TABLE 1

In vitro test for ovicidal effect on ticks

| Active compound | Ovicidal effect against Boophilus (Biarra-strain): inhibition with the stated concentration— | |
|---|---|---|
| | 100% | 50% |
| (A) 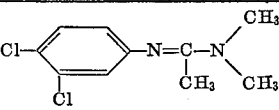 (known) | ----------- | 1.0 |
| (2) 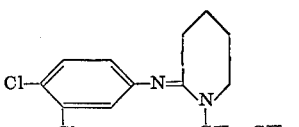 | 0.1 | 0.05 |
| (3) 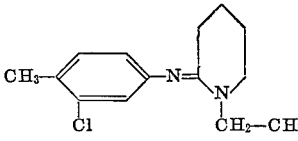 | 0.1 | 0.04 |
| (4) 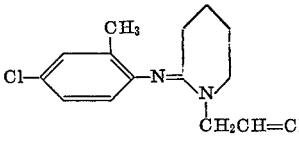 | 0.3 | 0.2 |
| (5) 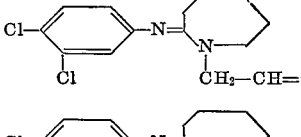 | 0.3 | 0.1 |
| (1) 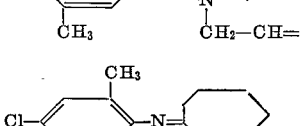 | 0.03 | 0.02 |
| (6) 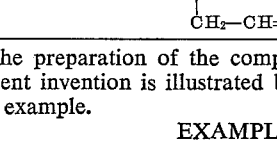 | 0.3 | 0.1 |

The preparation of the compounds to be used in the present invention is illustrated by the following preparative example.

EXAMPLE 2

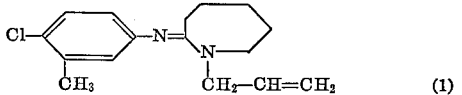

40 g. of phosphorus oxychloride are added to 40 g. of N-allylcaprolactam and 34 g. of 3-methyl-4-chloroaniline in 400 ml. of toluene, and heating under reflux is effected for 3 to 4 hours until the evolution of hydrogen chloride has ended. The mixture is then poured into ice water and excess solution of sodium hydroxide, the toluene layer is separated and drying over potassium carbonate is effected. By fractional distillation there are obtained 60 g. of 2-(3'-methyl-4'-chlorophenylimino)-1-allylcaprolactam with a boiling point in the range 173 to 177° C./ 0.5 mm. Hg.

Preliminary product

The N-allylcaprolactam used for the reaction is obtained by reaction of the sodium salt of caprolactam with allyl bromide in boiling toluene; the compound has a boiling point B.P. 128 to 132° C./12 mm. Hg.

The following compounds are obtained by analogous methods.

| Compound | Boiling point/ mm. Hg |
|---|---|
| (2) 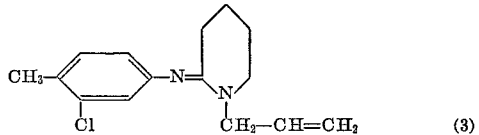 | 163–170° C./0.5 |
| (3) | 158–165° C./0.5 |
| (4) 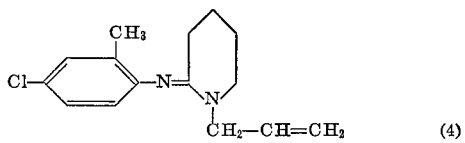 | 149–154° C./0.3 |
| (5) | 180–185° C./0.4 |
| (6) 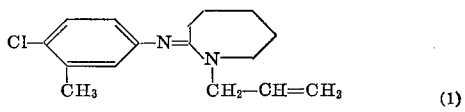 | 172–176° C./0.6 |

It will be realized that all of the foregoing compounds contemplated by the present invention possess the desired selective pesticidal, especially parasiticidal, i.e. animal acarid ectoparasiticidal, properties for combating parasites, especially animal acarid ectoparasites, and that such compounds have only a very slight toxicity toward warm-blooded creatures.

It will be appreciated that the instant specification and examples are set forth by way of illustration and not limitation, and that various modifications and changes may be made without departing from the spirit and scope of the present invention.

What is claimed is:

1. A method of controlling animal acarid ectoparasites, which comprises applying to at least one of (a) such animal acarid ectoparasites, and (b) their animal habitat, an acarid ectoparasiticidally effective amount of a 2-aryl-imino-1-alyl lactam of the formula:

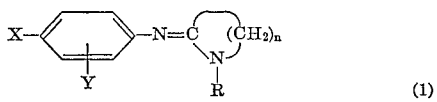

in which one of X and Y is halogen and the other is halogen or lower alkyl,
R is alkenyl with up to 6 carbon atoms, and
$n$ is 4 or 5.

2. The method of claim 1 in which one of X and Y is chlorine, bromine or fluorine and the other is chlorine, bromine, fluorine, methyl or ethyl, and R is alkenyl with up to 4 carbon atoms.

3. The method of claim 1 wherein the active ingredient is 2-(3',4'-dichlorophenylimino)-1-allylvalerolactam of the formula:

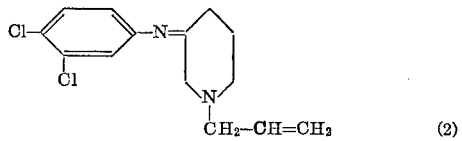

4. The method of claim 1 wherein the active ingredient is 2-(3'-chloro-4'-methylphenylimino) - 1 - allylvalerolactam of the formula:

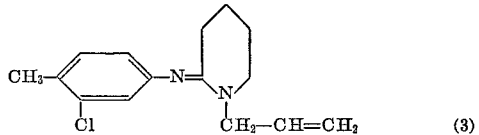

5. The method of claim 1 wherein the active ingredient is 2-(2'-methyl - 4' - chlorophenylimino)-1-allylvalerolactam of the formula:

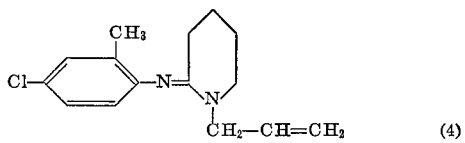

6. The method of claim 1 wherein the active ingredient is 2 - (3',4' - dichlorophenylimino) - 1 - allylcaprolactam of the formula:

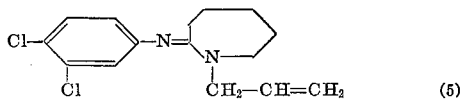

7. The method of claim 1 wherein the active ingredient is 2 - (3' - methyl - 4' - chlorophenylimino) - 1 - allylcaprolactam of the formula:

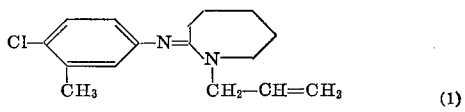

8. The method of claim 1 wherein the active ingredient is 2 - (2' - methyl - 4' - chlorophenylimino) - 1 - caprolactam of the formula:

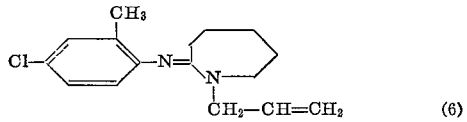

in admixture with a solid diluent or carrier or in admixture with a liquid diluent or carrier containing a surface-active agent.

References Cited

UNITED STATES PATENTS

| | | | |
|---|---|---|---|
| 3,284,465 | 11/1966 | Scola | 260—326.85 |
| 3,492,407 | 1/1970 | Anders et al. | 424—315 |
| 3,563,994 | 2/1971 | Wollweber et al. | 260—93 |
| 3,574,837 | 4/1971 | Pacheco et al. | 424—248 |

ALBERT T. MEYERS, Primary Examiner
F. E. WADDELL, Assistant Examiner

U.S. Cl. X.R.
424—244